Patented Apr. 23, 1940

2,198,013

UNITED STATES PATENT OFFICE 2,198,013

SWEEPING COMPOSITION

Harold S. Olcott, Pittsburgh, Pa., assignor to Cotton Research Foundation, Memphis, Tenn., a corporation of Tennessee No Drawing. Application June 23, 1938, Serial No. 215,409

2 Claims. (Cl. 87—5)

This invention relates to sweeping compositions, and consists in a sweeping composition formed essentially of a new material and manifesting superior utility. The new material here alluded to is cottonseed hull bran.

Sweeping compositions are preparations of inert and finely divided material which, scattered on floors prior to sweeping, facilitate the accumulation of dust and dirt and prevent the rising of dust under the action of the broom. The sweeping composition most familiar to casual observation is moist sawdust. Various preparations have been produced commercially; their usual constituents are sawdust and sand, modified by wetting agents; and paraffin or mineral oil are the usual wetting agents.

In the usual treatment of cotton seeds, the seeds first are cut or cracked, and the meats are extracted; the remaining hulls are placed in beaters and reduced to small fragments; the so comminuted mass is subjected to a blowing mechanism, by which many short linters are removed; and the remaining material is what is known as cottonseed hull bran. It consists of fragments of hull that are hirsute, with a multitude of minute short fibres.

As a result of considerable experimentation, I have found that, by adding to cottonseed hull bran a small quantity of mineral oil, a superior sweeping composition may be obtained. An exemplary preparation consists of an intimate mixture of cottonseed hull bran, 95.6% by weight; and paraffin oil, 4.4%. Mixing may be effected in a mechanical mill. The mass is light and bulky. Its porosity, the minute hairiness of its particles, and the wetting property of the distributed oil are features of value in the taking up and retaining of the dirt and dust that are to be carried away by sweeping.

This preparation, by virtue of its lightness, may be used in smaller quantities by weight than any preparation of sawdust; it will take up and carry away dirt and dust more effectively than any preparation of sawdust. It may be kept indefinitely in storage without deterioration.

A test in demonstration of the superior dust-retaining property of the composition of the invention was conducted in the following manner. To a quantity of 10 grams of the composition of the invention, 3 grams of precipitated chalk were added and mixed; the mixture was shaken upon an 80-mesh screen, and it was found that none of the chalk could be shaken through, although the chalk itself was of such fineness of division as freely to pass through. The same experiment was performed upon a commercial preparation of sawdust (much more heavily laden with oil), and it was found that the preparation was able to retain no more than 40% of the mixed-in chalk. The greater part escaped and passed through the screen.

In the practice of the invention the ratio in which the oil is added to the cottonseed hull bran may be varied. The ratio given above is suitable to afford excellent results. Paraffin oil, by virtue of its inertness and cheapness, is manifestly suitable. Unsaturated oils of mineral origin, and animal and vegetable oils as well, are available and useful, it being requisite to utility that they be liquid or viscid at room temperature. In widest contemplation, it is requisite to utility that the mass of cottonseed hull bran be rendered more coherent, and that its capacity to take up dirt and dust be increased, by wetting; and wetting may be effected by liquids of all sorts, including, of course, water. Water will serve, so also will glycerine; but the oils, by their unctious quality, and particularly the paraffin oils, by their inertness and durability, suffering neither chemical change nor deleterious evaporation, and by their cheapness as well, are pre-eminently suitable for my purpose. The wetting material in any case is, at atmospheric temperatures, substantially non-volatile and inert to the fragmented hull; and it is added in quantity insufficient to destroy the light, fluffy character of the fragmented hull.

Dye may be employed if desired, and essential oil may be added, to render the article more attractive on the market; and such additions will not prejudice the utility of the composition.

In preparation of the composition the cottonseed hull bran may be adulterated with other inferior material, such as sawdust (though I prefer not to do so); and, conceivably, for particular uses, other particular material may be added; but the essence of the invention is found in compounding cottonseed hull bran with oil.

I claim as my invention:

1. A sweeping composition consisting of fragmented cottonseed hull with hirsute surfaces and a wetting liquid that at atmospheric temperatures is substantially non-volatile and inert to the fragmented hull, the quantity of wetting liquid relatively to the quantity of the fragmented hull being insufficient to destroy the esssential light, fluffy character of the fragmented hull.

2. A sweeping composition consisting of fragmented cottonseed hull with hirsute surfaces and a paraffin oil that at atmospheric temperatures is liquid and substantially non-volatile, the quantity of paraffin oil relatively to the quantity of fragmented hull being insufficient to destroy the essential light, fluffy character of the fragmented hull.

HAROLD S. OLCOTT.